United States Patent
Bishop, III et al.

(10) Patent No.: US 12,229,277 B2
(45) Date of Patent: *Feb. 18, 2025

(54) SOURCE CODE CLUSTERING FOR AUTOMATICALLY IDENTIFYING FALSE POSITIVES GENERATED THROUGH STATIC APPLICATION SECURITY TESTING

(71) Applicant: BANK OF AMERICA CORPORATION, Charlotte, NC (US)

(72) Inventors: Jack Lawson Bishop, III, Evanston, IL (US); Anthony Herron, Upper Marlboro, MD (US); Yao Houkpati, Woodbridge, VA (US); Carrie E. Gates, Livermore, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,538

(22) Filed: Jan. 10, 2024

(65) Prior Publication Data

US 2024/0143786 A1    May 2, 2024

Related U.S. Application Data

(63) Continuation of application No. 17/536,916, filed on Nov. 29, 2021, now Pat. No. 11,928,221.

(51) Int. Cl.
*G06F 21/57*    (2013.01)
*G06F 8/41*    (2018.01)
(Continued)

(52) U.S. Cl.
CPC .......... *G06F 21/577* (2013.01); *G06F 8/427* (2013.01); *G06F 8/75* (2013.01); *G06F 21/563* (2013.01);
(Continued)

(58) Field of Classification Search
CPC .......... G06F 21/577; G06F 8/427; G06F 8/75; G06F 21/563; G06F 2221/033; G06F 2221/034; G06F 8/71; H04L 63/1433
See application file for complete search history.

(56) References Cited

U.S. PATENT DOCUMENTS

| 7,594,270 B2 | 9/2009 | Church et al. |
| 8,298,835 B2 | 10/2012 | Wang et al. |

(Continued)

OTHER PUBLICATIONS

Bishop III, et al.; Automatic Vulnerability Detection Based on Clustering of Applications With Similar Structures and Data Flows; U.S. Appl. No. 17/537,042, filed Nov. 29, 2021.

*Primary Examiner* — Cheng-Feng Huang (57) ABSTRACT

A system includes a memory and processor. The memory stores code segment vulnerability findings that were generated through static application security testing (SAST). For a first code segment, a first vulnerability finding has been classified as a real vulnerability, and a second vulnerability finding has been classified as a false positive by external review. The processor generates a code fingerprint for each code segment, which corresponds to an abstract syntax tree that has been augmented by data flow information and flattened. The processor determines that the fingerprint for the first code segment matches the fingerprint for a second code segment and that the vulnerability findings for the first code segment match those for the second. In response, the processor automatically classifies a matching first vulnerability finding for the second code segment as the real vulnerability, and a matching second vulnerability finding for the second code segment as the false positive.

20 Claims, 3 Drawing Sheets

(51) Int. Cl.
*G06F 8/75* (2018.01)
*G06F 21/56* (2013.01)
*H04L 9/40* (2022.01)

(52) U.S. Cl.
CPC .... *H04L 63/1433* (2013.01); *G06F 2221/033* (2013.01); *G06F 2221/034* (2013.01)

(56) References Cited

U.S. PATENT DOCUMENTS

| | | |
|---|---|---|
| 8,566,121 B2 | 10/2013 | Ramasubramanian et al. |
| 8,636,670 B2 | 1/2014 | Ferren et al. |
| 8,671,224 B2 | 3/2014 | Bell et al. |
| 8,762,188 B2 | 6/2014 | Abercrombie et al. |
| 8,811,692 B2 | 8/2014 | Prokoski |
| 8,844,044 B2 | 9/2014 | Kennedy et al. |
| 8,870,813 B2 | 10/2014 | Ferren et al. |
| 8,893,276 B2 | 11/2014 | Sutherland et al. |
| 8,945,009 B2 | 2/2015 | Brown et al. |
| 9,015,846 B2 | 4/2015 | Watters et al. |
| 9,325,728 B1 | 4/2016 | Kennedy et al. |
| 9,369,481 B2 | 6/2016 | Howes et al. |
| 9,400,889 B2 | 7/2016 | Chess et al. |
| 9,408,575 B2 | 8/2016 | Bordoley et al. |
| 9,665,721 B2 | 5/2017 | Artes et al. |
| 9,720,758 B2 | 8/2017 | Jacoby |
| 9,846,780 B2 | 12/2017 | Tonn et al. |
| 9,864,860 B2 | 1/2018 | Burrell et al. |
| 9,875,777 B2 | 1/2018 | Yun et al. |
| 9,883,801 B2 | 2/2018 | Stump et al. |
| 9,940,190 B2 | 4/2018 | Hooks |
| 10,135,856 B2 | 11/2018 | Tripp |
| 10,200,389 B2 | 2/2019 | Rostamabadi et al. |
| 10,200,390 B2 | 2/2019 | Rostami-Hesarsorkh et al. |
| 10,530,789 B2 | 1/2020 | Rostamabadi et al. |
| 10,735,454 B2 | 8/2020 | Ahuja et al. |
| 10,768,893 B2 | 9/2020 | Misra et al. |
| 10,966,669 B2 | 4/2021 | Samadani |
| 10,972,493 B2 | 4/2021 | Rostami-Hesarsorkh et al. |
| 11,003,766 B2 | 5/2021 | Kraus et al. |
| 11,013,441 B2 | 5/2021 | Samadani |
| 11,861,013 B2 | 1/2024 | Tarrant et al. |
| 2014/0259170 A1 | 9/2014 | Amsler |
| 2014/0283096 A1* | 9/2014 | Neerumalla ............ G06F 21/10 726/26 |
| 2015/0079921 A1 | 3/2015 | Johnson |
| 2016/0330219 A1 | 11/2016 | Hasan |
| 2017/0126712 A1 | 5/2017 | Crabtree et al. |
| 2017/0185783 A1* | 6/2017 | Brucker ................ G06F 21/577 |
| 2019/0220978 A1 | 7/2019 | Moehrle et al. |
| 2019/0260804 A1 | 8/2019 | Beck et al. |
| 2020/0067861 A1 | 2/2020 | Leddy et al. |
| 2020/0125733 A1 | 4/2020 | Murano et al. |
| 2020/0134194 A1* | 4/2020 | Youngberg ........... G06F 21/563 |
| 2020/0185100 A1 | 6/2020 | Francois |
| 2021/0157926 A1* | 5/2021 | Handurukande ..... G06F 21/563 |
| 2021/0173621 A1* | 6/2021 | Fender ...................... G06F 8/71 |
| 2021/0211450 A1* | 7/2021 | Aleidan .............. H04L 63/1416 |
| 2021/0288993 A1 | 9/2021 | Kraning et al. |
| 2022/0100868 A1* | 3/2022 | Tarrant .................. G06N 20/00 |
| 2022/0179626 A1* | 6/2022 | Kacherginsky ....... H04L 9/3236 |
| 2022/0188079 A1* | 6/2022 | Kohisseri ................ G06N 5/04 |
| 2023/0334388 A1 | 10/2023 | McCarthy et al. |

* cited by examiner

SOURCE CODE CLUSTERING FOR AUTOMATICALLY IDENTIFYING FALSE POSITIVES GENERATED THROUGH STATIC APPLICATION SECURITY TESTING

CROSS-REFERENCE TO RELATED APPLICATION

The application is a continuation of U.S. patent application Ser. No. 17/536,916, filed Nov. 29, 2021, entitled "SOURCE CODE CLUSTERING FOR AUTOMATICALLY IDENTIFYING FALSE POSITIVES GENERATED THROUGH STATIC APPLICATION SECURITY TESTING," which is incorporated herein by reference.

TECHNICAL FIELD

The present disclosure relates generally to information security and vulnerability assessment in source code, and more particularly, to source code clustering for automatically identifying false positives generated through static application security testing.

BACKGROUND

Static Application Security Testing (SAST) is a technique for analyzing source code to identify potential security vulnerabilities within the code. Such vulnerabilities may include, for example, buffer overflow vulnerabilities, SQL injection vulnerabilities, and cross-site scripting vulnerabilities, among others. In order to help ensure that any security vulnerabilities within a software code are identified, SAST tools are often designed to be over-inclusive. Accordingly, the findings reported by a SAST analysis often include false positives (i.e., findings that are not relevant to the security or safety of the analyzed source code). In order to separate these false positives from actual security vulnerabilities identified during the SAST analysis, an analysis of the SAST findings is often performed, during which considerable computational resources (e.g., processing and/or memory resources) may be consumed, particularly for organizations that operate thousands of applications, each of which is subjected to SAST analysis.

SUMMARY

This disclosure contemplates a security vulnerability triage tool that is configured to automatically and efficiently classify vulnerability findings generated through static application security testing (SAST) as real vulnerabilities or false positives. In particular, the tool is designed to cluster source code segments into similarity groups, under the assumption that similar source code segments are likely to exhibit similar security vulnerabilities. For example, if a first source code segment is known to exhibit a given security vulnerability, then a second source code segment that performs the same functions as the first source code segment and differs only in minor details from the first source code segment—for example, it uses different variable naming conventions—is likely to also exhibit that same vulnerability. To perform such clustering, the tool is designed to generate a "source code fingerprint" for each source code segment, which includes information associated with the structure, function, and data flow associated with the source code segment, and to apply a machine learning clustering algorithm to the collection of source code fingerprints to identify clusters of similar fingerprints.

By leveraging prior review of the vulnerability findings associated with similar source code segments, to automatically classify the vulnerability findings for a given source code segment as actual vulnerabilities or false positives, the tool is able to conserve considerable processing and memory resources that would otherwise be expended if false positives were not identified within the vulnerability findings generated through SAST analysis and computer resources were allocated to dealing with false security vulnerabilities. Furthermore, by automatically identifying false positives, certain embodiments of the tool provide enhanced security by enabling resources to be directed towards addressing/resolving actual security vulnerabilities, rather than being expending on investigating false positives. In this manner, certain embodiments of the tool provide technical improvements to the computer system on which the source code is installed. For example, by resolving actual security vulnerabilities, certain embodiments may prevent viruses and malware from infecting an organization's computer system. This in turn may (1) conserve processing and memory resources that would otherwise be consumed by the viruses/malware operating within the system, (2) allow the software installed on that system to run faster and smoother, avoiding system crashes/failures that may be caused by the viruses/malware, (3) conserve networking resources that may otherwise be expended by the virus/malware communicating with other systems (e.g., in an attempt to infect those other systems), and (4) protect data stored within the system from corruption by the viruses/malware, avoiding the need to expend computational resources in reproducing corrupted data. Given that organizations are typically only able to direct a finite amount of resources towards application security, focusing those resources on actual security vulnerabilities rather than false positives means that actual vulnerabilities may be resolved sooner than would otherwise be the case, thereby reducing the likelihood that the vulnerability is identified and used by viruses/malware to gain access to the computer system. Certain embodiments of the tool are described below.

According to an embodiment, a system includes a database, a memory, and a hardware processor communicatively coupled to the database and the memory. The database stores a plurality of source code segments. The plurality of source code segment includes a first source code segment and a second source code segment. The memory stores a first plurality of vulnerability findings for the first source code segment and a second plurality of vulnerability findings for the second source code segment. The first plurality of vulnerability findings were generated through static application security testing (SAST) of the first source code segment. A first vulnerability finding of the first plurality of vulnerability findings has been classified as a real vulnerability by an external review, and a second vulnerability finding of the first plurality of vulnerability findings has been classified as a false positive by the external review. The second plurality of vulnerability findings were generated through SAST of the second source code segment. The hardware processor generates a plurality of source code fingerprints. Each source code fingerprint of the plurality of source code fingerprints corresponds to a source code segment of the plurality of source code segments. Generating the source code fingerprint includes (1) generating, from the corresponding source code segment, an abstract syntax tree, (2) performing a data flow analysis on the corresponding source code segment, to generate information identifying flows of data through the corresponding source code segment, (3) augmenting the abstract syntax tree associated with the source code segment with the information identifying the flows of data through the source code segment, and (4) flattening the augmented abstract syntax tree associated with the source code segment. The hardware processor also determines that the source code fingerprint corresponding to the first source code segment matches the source code fingerprint corresponding to the second source code segment. In response to determining that the source code fingerprint corresponding to the first source code segment matches the source code fingerprint corresponding to the second source code segment, the hardware processor automatically classifies a first vulnerability finding of the second plurality of vulnerability findings as the real vulnerability, in response to determining that the first vulnerability finding of the second plurality of vulnerability findings matches the first vulnerability finding of the first plurality of vulnerability findings. The hardware processor further automatically classifies a second vulnerability finding of the second plurality of vulnerability findings as the false positive, in response to determining that the second vulnerability finding of the second plurality of vulnerability findings matches the second vulnerability finding of the first plurality of vulnerability findings.

According to another embodiment, a system includes a database, a memory, and a hardware processor communicatively coupled to the memory and to the database. The database stores a plurality of source code segments. The plurality of source code segments includes a first source code segment and a second source code segment. The memory stores a vulnerability finding for the first source code segment. The vulnerability finding was generated through static application security testing (SAST) of the first source code segment and was classified as a real vulnerability by an external review process. The hardware processor generates a plurality of source code fingerprints. Each source code fingerprint of the plurality of source code fingerprints corresponds to a source code segment of the plurality of source code segments. Generating the source code fingerprint includes (1) generating, from the corresponding source code segment, an abstract syntax tree, (2) performing a data flow analysis on the corresponding source code segment, to generate information identifying flows of data through the corresponding source code segment, (3) augmenting the abstract syntax tree associated with the source code segment with the information identifying the flows of data through the source code segment, and (4) flattening the augmented abstract syntax tree associated with the source code segment. The processor also applies a machine learning clustering algorithm to the plurality of source code fingerprints to group the plurality of source code fingerprints into a plurality of clusters. Each cluster of the plurality of clusters includes one or more source code fingerprints. Each of the one or more source code fingerprints of the cluster shares one or more features identified by the machine learning clustering algorithm. The processor additionally determines that both the source code fingerprint corresponding to the first source code segment and the source code fingerprint corresponding to the second source code segment belong to a first cluster of the plurality of clusters. In response to determining that both the source code fingerprint corresponding to the first source code segment and the source code fingerprint corresponding to the second source code segment belong to the first cluster of the plurality of clusters, the processor transmits an alert to a device of an administrator. The alert identifies the second source code segment as vulnerable to the real vulnerability.

The tool described in the present disclosure may be integrated into a practical application of a security vulnerability triage tool that can automatically identify false positives from the vulnerability findings generated during SAST analysis, and remove those false positives from the vulnerability findings. In this manner, the tool may conserve considerable computational resources that would otherwise be expended as part of an external review process during which each vulnerability finding generated during the SAST analysis is reviewed, in order to make sure it is not a false positive. Furthermore, the tool may conserve considerable processing resources that would otherwise be expended on attempting to resolve false security vulnerabilities, if false positives are not identified within the vulnerability findings generated during the SAST analysis The tool may also provide a practical application of an application security tool that identifies and resolves potential source code vulnerabilities, based on similar vulnerabilities that have been identified and resolved for similar source code. By automatically identifying and resolving such security vulnerabilities, the tool may protect the system on which the source code is installed from unintentional data loss and/or other undesirable consequences of bad actors using the source code vulnerability to gain access to the system. For example, the tool may prevent viruses/malware from gaining access to the system and consuming system resources otherwise available to valid applications operating within the system (e.g., processing resources consumed by the operation of the viruses/malware, networking resources consumed by the viruses/malware attempting to spread to other computer systems, etc.). This may enable those valid applications to run faster and smoother than on an infected system, and may protect the system from system failures/crashes that lead to unintentional system downtime, interrupted processes, and/or data loss.

The tool may also provide a practical application by verifying the performance of one or more external SAST tools. In particular, by converting segments of source code into source code fingerprints, and identifying source code segments that share the same fingerprint, the tool is able to easily identify those source code segments that should exhibit the same security vulnerabilities as one another. Thus, the tool may identify any errors that have occurred during the SAST analysis process, based on any inconsistencies between the vulnerability findings generated for a first source code segment and the vulnerability findings generated for a second source code segment that shares the same fingerprint as the first source code segment. In this manner, the tool may identify and alert developers of the SAST tool to potential issues with the tool, thereby saving the computational resources that would otherwise be expended by the SAST tool in generating potentially erroneous findings, and by developers analyzing any erroneous findings.

Certain embodiments may provide one or more technical advantages. As an example, by automatically identifying false positives within the vulnerability findings generated by a SAST tool, certain embodiments conserve processing and memory resources that would otherwise be expended during an analysis of each of the vulnerability findings generated by the SAST tool. As another example, by automatically prioritizing vulnerability findings that based on the likelihood that the vulnerability finding is associated with an actual vulnerability (as opposed to a false positive), certain embodiments enable the actual vulnerabilities within a system to be resolved earlier than otherwise, thereby improving system security. As a further example, by generating a source code fingerprint for each source code segment, certain embodiments are able to efficiently identify similar source code segments, which are likely to exhibit similar security vulnerabilities.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
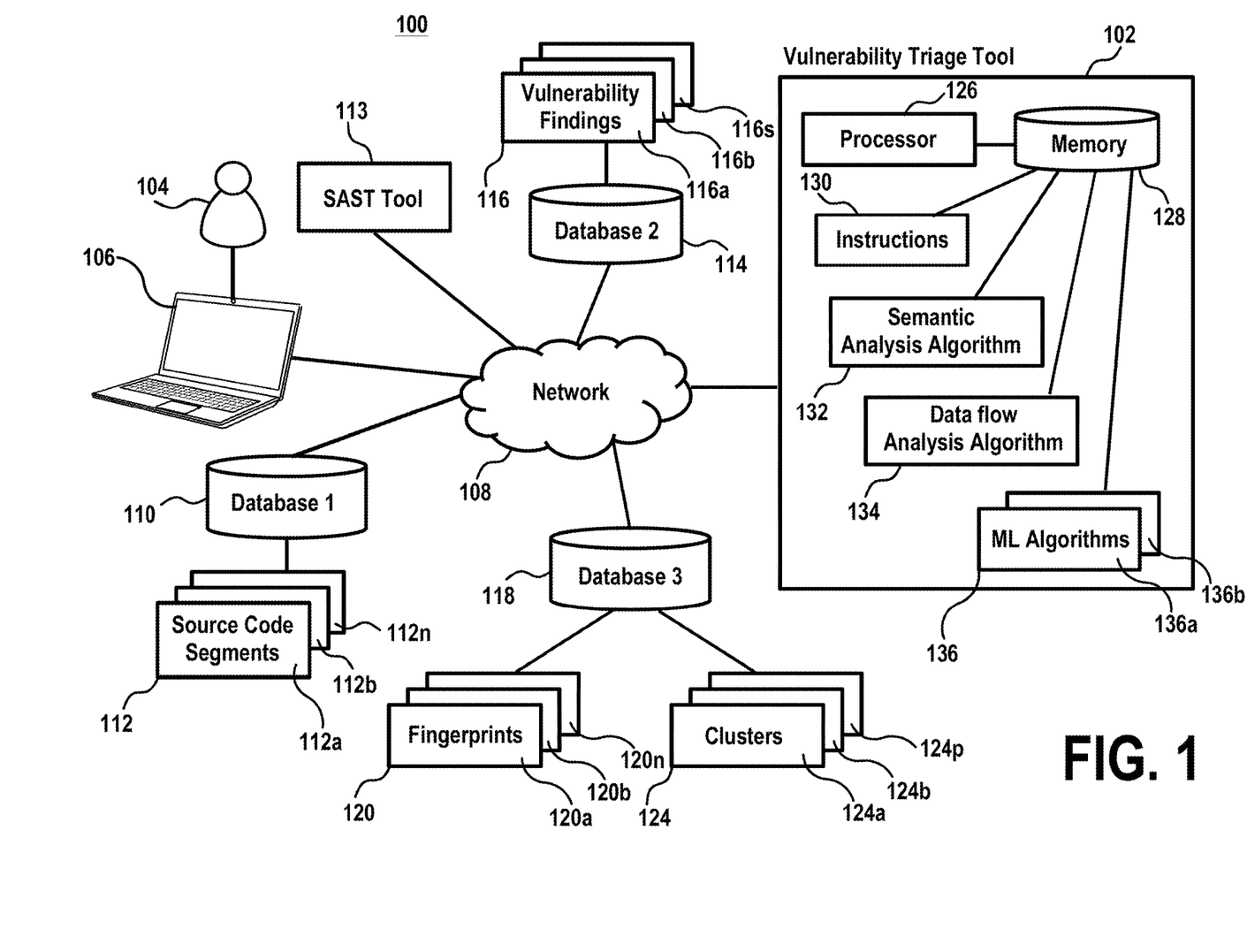
FIG. 1 illustrates an example security vulnerability triage system.
Figure 2:
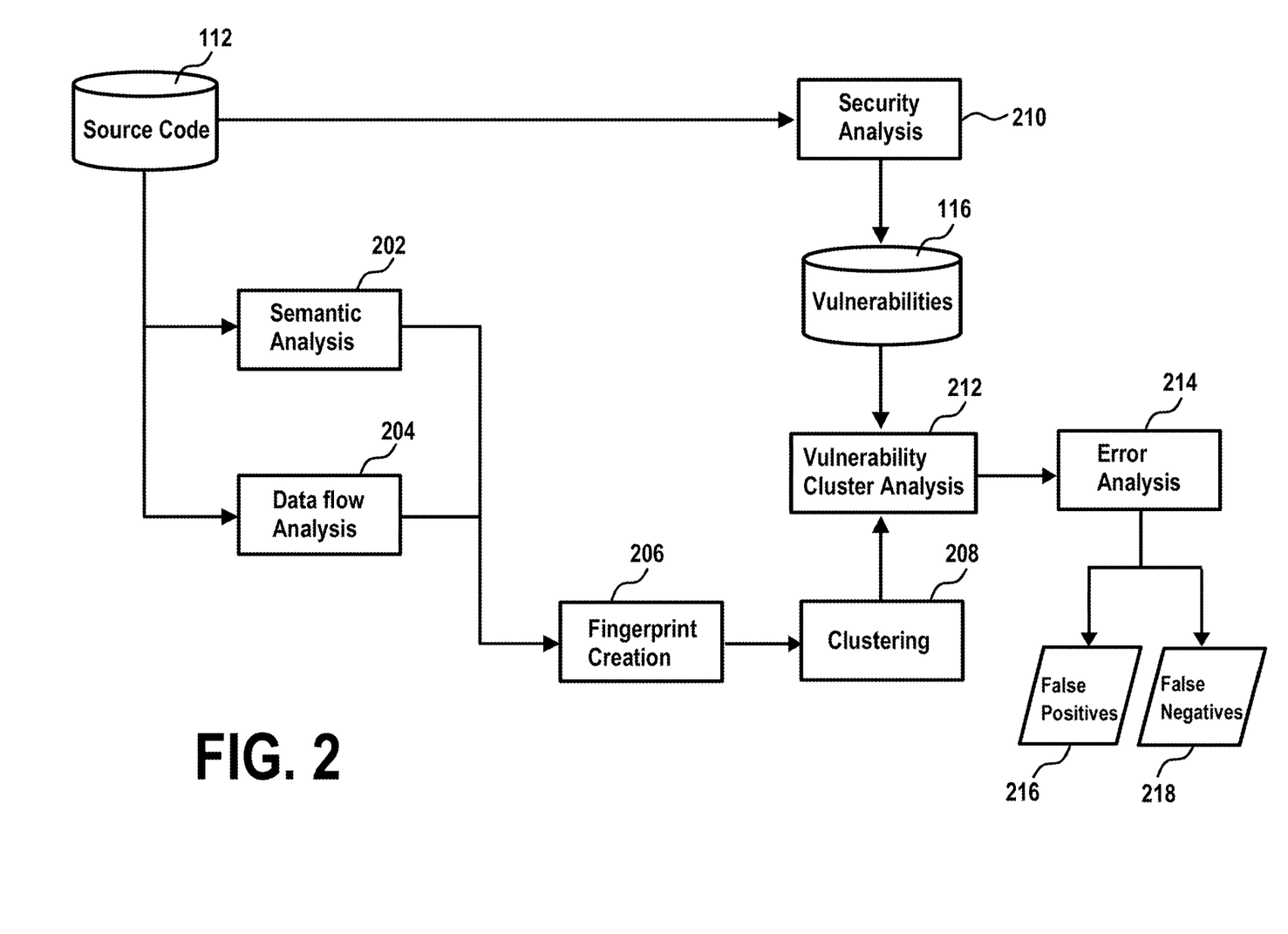
FIG. 2 illustrates an example process by which the vulnerability triage tool of the system of FIG. 1 identifies potential false positives and/or false negatives in the vulnerability findings generated by static application security testing of the applications within the system.
Figure 3:
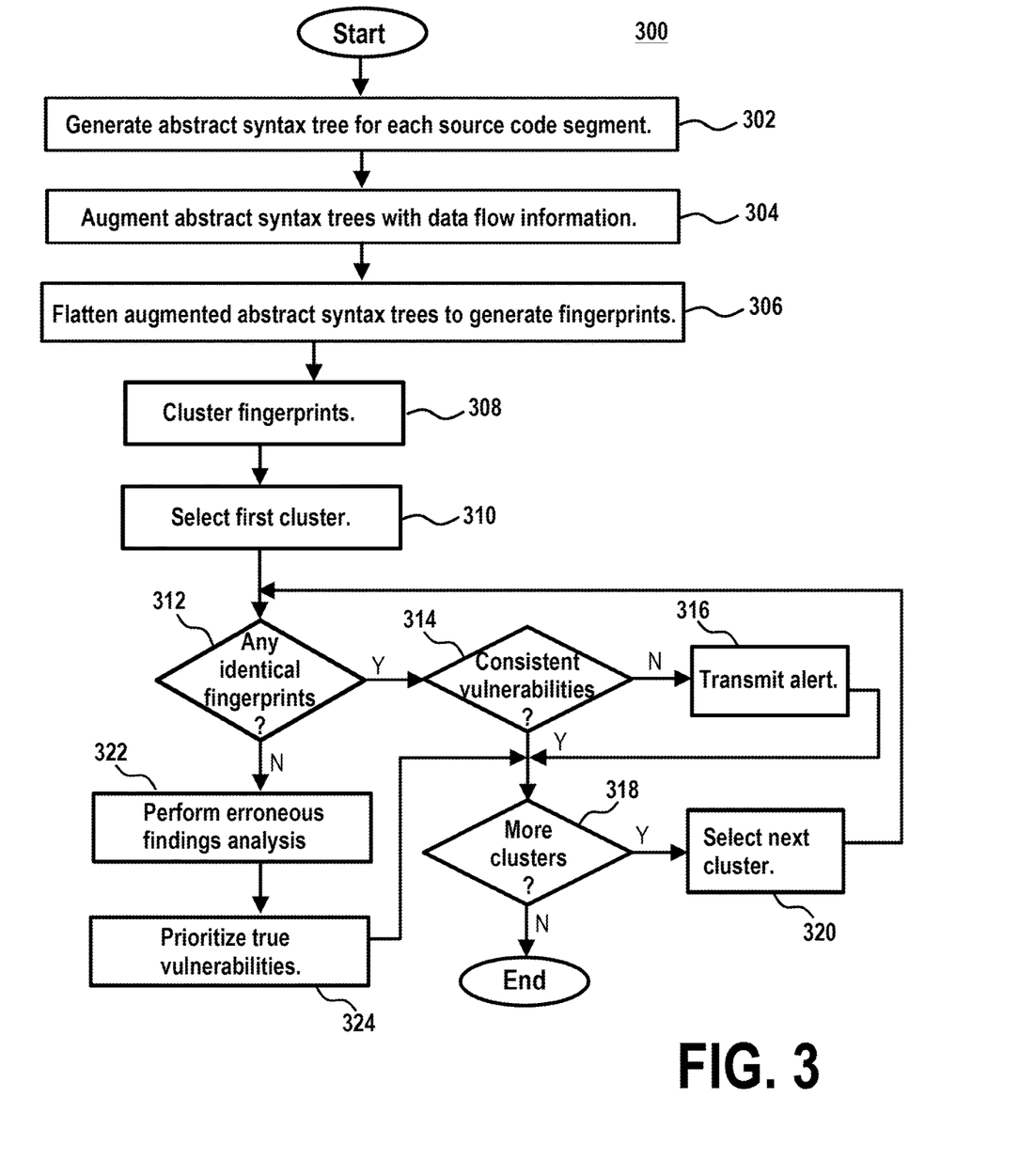
FIG. 3 presents a flowchart illustrating the manner by which the vulnerability triage tool of the system of FIG. 1 groups similar source code segments together.

Embodiments of the present disclosure and its advantages may be understood by referring to FIGS. 1 through 3 of the drawings, like numerals being used for like and corresponding parts of the various drawings.

I. System Overview

FIG. 1 illustrates an example security vulnerability triage system 100 that includes user(s) 104 (e.g., source code developer(s)), device(s) 106, network 108, first database 110, second database 114, third database 118, SAST tool 113, and vulnerability triage tool 102. As illustrated in FIG. 1, first database 110 stores a set of source code segments 112, and second database 114 stores a set of security vulnerability findings 116 generated by SAST tool 113, through static application security testing (SAST) of source code segments 112. In the context of this disclosure, a security vulnerability is a flaw in a source code segment 112 that creates a security risk, while a security vulnerability finding 116 is a potential security vulnerability that has been identified by SAST tool 113 for a given source code segment 112. Due to the limitations of the static analysis process, SAST tends to generate a significant number of false positives in addition to identifying actual security vulnerabilities within source code. Because teams of developers 104 typically need to triage and investigate each security vulnerability finding 116 generated during a SAST process, considerable processing and memory resources may be saved by identifying and removing false positives from security vulnerability findings 116 before such investigation occurs.

Vulnerability triage tool 102 is configured to identify likely false positives within security vulnerability findings 116, in a computationally efficient manner, without relying on external review. In particular, the tool is configured to leverage validated vulnerability findings (e.g., vulnerability findings that have already undergone an external investigation/review process and have been labelled as actual vulnerabilities or false positives), to automatically identify likely false positives and/or actual vulnerabilities within those vulnerability findings 116 that have not yet undergone external review. To do so, the tool groups similar source code segments 116 into clusters 124, and uses any validated vulnerability findings within each cluster 124 (e.g., any vulnerability findings that have already undergone the external review process and have been classified as false positives or actual vulnerabilities) to identify likely false positives and/or likely actual vulnerabilities among those vulnerability findings 116 within the cluster that have not been subject to external review. Further details of the manner by which vulnerability triage tool 102 performs these tasks are presented below, and in the discussion of FIGS. 2 and 3.

Device(s) 106 are used by user(s) 104 (e.g., source code developers) to: (1) communicate with vulnerability triage tool 102; (2) review vulnerability findings 116; (3) review source code segments 112; and/or (4) repair actual vulnerabilities within source code segments 112. As an example, user 104 may use device 106 to review a set of vulnerability findings 116a generated for a given source code segment 112a, to determine which (if any) of the vulnerability findings 116a correspond to actual vulnerabilities, and which (if any) correspond to false positives. As part of this process, user 104 may use device 106 to review the source code segment 112a (or a portion of the source code segment 112a) for which vulnerability findings 116a were generated. User 104 may also use device 106 to address any vulnerability findings 116a that correspond to actual vulnerabilities. For example, user 104 may use device 106 to edit source code 112a, to repair the source code segment by removing the vulnerability.

Devices 106 include any appropriate device for communicating with components of system 100 over network 108. For example, devices 106 may include a mobile phone, a computer, a laptop, a wireless or cellular telephone, a tablet, a server, an IoT device, and/or an automated assistant, among others. This disclosure contemplates devices 106 being any appropriate device for sending and receiving information over network 108, and/or displaying information (e.g., vulnerability findings 116, source code segments 112, etc.). In some embodiments, device 106 may include a display, a keypad, or other appropriate terminal equipment usable by user 104. In some embodiments, an application executed by a processor of device 106 may perform the functions described herein.

Network 108 facilitates communications between components of system 100 including, for example, vulnerability triage tool 102, devices 106, first database 110, second database 114, third database 118, and/or SAST tool 113. Network 108 may include any interconnecting systems capable of transmitting audio, video, signals, data, messages, or any combination of the preceding. For example, network 108 may include all or a portion of a public switched telephone network (PSTN), a public data network, a metropolitan area network (MAN), a wide area network (WAN), a local, regional, or global communication or computer network, such as the Internet, a wireline or wireless network, or any other suitable communication link, including combinations thereof, operable to facilitate communication between components of system 100.

Database 110 is any storage location within system 100 where source code segments 112 may be stored. For example, database 110 may correspond to a database, a server, a local storage system, an external storage system, cloud storage, and/or any other suitable storage location. In certain embodiments, database 110 may correspond to a source code repository.

Each source code segment 112a through 112n stored within database 110 corresponds to a portion of source code. As an example, in certain embodiments, a given source code segment 112a may correspond to all of the source code that makes up an application. As another example, in some embodiments, a source code segment 112a may correspond to a portion of the source code that makes up an application. For instance, source code segment 112a may correspond to a function or subroutine that is used within an application. Each of source code segments 112a through 112n may be written in any suitable programming language. For example, one or more of source code segments 112a through 112n may be written in C++, C #, Java, Python, Scala, JavaScript, Perl, Ruby, HTML, any other suitable programming language, and/or any suitable combination of the preceding.

SAST tool 113 corresponds to any suitable static application security testing tool that is configured to analyze source code segments 112 (and/or object code generated from source code segments 112), without executing the code, in order to identify potential security vulnerabilities within the source code segments. This disclosure contemplates that SAST tool 113 may correspond to any open source and/or proprietary static application security testing tool including, for example, Klocwork, Checkmarx, Veracode, Codacy, Insider CLI, and/or any other suitable current or future static application security testing tool. SAST tool 113 may identify potential security vulnerabilities within a given source code segment 112 in any suitable manner. For example, SAST tool 113 may identify vulnerabilities by highlighting portions of potentially problematic code, providing a snippet of the code segment associated with the potential vulnerability, identifying a portion of the code segment associated with the potential vulnerability by filename, location, and/or line number, identifying a type of the potential vulnerability (e.g., buffer overflow vulnerability, cross-site scripting vulnerability, SQL injection vulnerability, etc.) and/or in any other suitable manner.

Database 114 is any storage location within system 100 where the vulnerability findings 116 that have been generated by SAST tool 113 may be stored. For example, database 114 may correspond to a database, a server, a local storage system, an external storage system, cloud storage, and/or any other suitable storage location. In certain embodiments, SAST tool 113 is configured to store vulnerability findings 116 directly within database 114. In some embodiments, SAST tool 113 is configured to provide vulnerability findings 116 to another component of system 100, which then stores the vulnerability findings in database 114. For example, SAST tool 113 may provide vulnerability findings 116 to either of device 106 or vulnerability triage tool 102, which may then store the findings in database 114.

Each of vulnerability findings 116a through 116s is associated with a source code segment 112 and corresponds to vulnerability findings generated by SAST tool 113 for the associated source code segment. Vulnerability findings 116 may identify any of a number of potential security vulnerabilities that may be present in source code 112. Such vulnerabilities may include, for example, vulnerabilities related to: (1) SQL injection; (2) cross-site scripting; (3) buffer overflows; (4) potential NULL pointer dereferences; (5) writes to potentially read-only memory; (6) use of memory that has already been deallocated; (7) use of out-of-scope memory, etc.

In certain embodiments, one or more of vulnerability findings 116 may also include an indication of whether or not the vulnerability finding has been verified by an external review. For example, in response to SAST tool 113 generating vulnerability findings 116a for source code segment 112a, user 104 may review the vulnerability findings to determine which (if any) correspond to actual vulnerabilities and which (if any) correspond to false positives. As a specific example, vulnerability findings 116a may include a first vulnerability finding and a second vulnerability finding. User 104 may review these vulnerability findings and determine that the first vulnerability finding corresponds to an actual vulnerability, while the second vulnerability finding corresponds to a false positive. Accordingly, user 104 may store, as part of vulnerability findings 116a in database 114, an indication that the first vulnerability finding within vulnerability findings 116a corresponds to an actual vulnerability and the second vulnerability finding within vulnerability findings 116a corresponds to a false positive.

As illustrated in FIG. 1, vulnerability triage tool 102 includes processor 126 and memory 128. This disclosure contemplates processor 126 and memory 128 being configured to perform any of the functions of vulnerability triage tool 102 described herein. Generally vulnerability triage tool 102 (1) generates a set of source code fingerprints 120 from source code segments 112, (2) groups the source code fingerprints into clusters 124, based on the similarities between the fingerprints, and (3) leverages any verified vulnerability findings within each cluster 124 to automatically classify certain of the other vulnerability findings within the cluster as false positives and/or actual vulnerabilities. The manner by which vulnerability triage tool 102 performs these functions is described in further detail below, and in the discussion of FIGS. 2 and 3.

Processor 126 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 128 and controls the operation of vulnerability triage tool 102. Processor 126 may be 8-bit, 16-bit, 32-bit, 64-bit or of any other suitable architecture. Processor 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 126 may include other hardware and software that operates to control and process information. Processor 126 executes software (e.g., instructions 130) stored on memory 128 to perform any of the functions described herein. Processor 126 controls the operation and administration of vulnerability triage tool 102 by processing information received from device(s) 106, network 108, first database 110, SAST tool 113, second database 114, third database 118, and/or memory 128. Processor 126 may be a programmable logic device, a microcontroller, a microprocessor, any suitable processing device, or any suitable combination of the preceding. Processor 126 is not limited to a single processing device and may encompass multiple processing devices.

Memory 128 may store, either permanently or temporarily, data, operational software, or other information/instructions 130 for processor 126. Memory 128 may include any one or a combination of volatile or non-volatile local or remote devices suitable for storing information. For example, memory 128 may include random access memory (RAM), read only memory (ROM), magnetic storage devices, optical storage devices, or any other suitable information storage device or a combination of these devices.

The software represents any suitable set of instructions, logic, or code embodied in a computer-readable storage medium. For example, the software may be embodied in memory 128, a disk, a CD, or a flash drive. In particular embodiments, the software may include an application executable by processor 126 to perform one or more of the functions described herein.

In certain embodiments, memory 128 may also store semantic analysis algorithm 132, data flow analysis algorithm 134, and machine learning algorithms 136a and 136b. Vulnerability triage tool 102 is configured to apply semantic analysis algorithm 132 and data flow analysis algorithm 134 to each of source code segments 112a through 112n to generate an augmented syntax tree corresponding to the source code segment. In particular, vulnerability triage tool 102 is configured to apply semantic analysis algorithm 132 to each source code segment 112a through 112n to generate an abstract syntax tree associated with the source code segment, which includes information related to the structure/content of the source code segment. Vulnerability triage tool 102 is also configured to apply data flow analysis algorithm 134 to each source code segment 112a through 112n, to generate information related to the flow of data through the source code segment—e.g., data ingress, usage, and egress within the source segment. Vulnerability triage tool 102 uses the data flow information that was generated by applying data flow analysis algorithm 134 to each source code segment 112a through 112n to augment the corresponding abstract syntax tree that was generated for each source code segment 112a through 112n using semantic analysis algorithm 132, forming an augmented abstract syntax tree for each source code segment 112a through 112n. Vulnerability triage tool 102 then generates a fingerprint 120 for each source code segment 112 by flattening the corresponding augmented abstract syntax tree that the tool had generated for the source code segment. Vulnerability triage tool 102 then stores each fingerprint 120a through 120n in database 118.

Machine learning algorithm 136a is a machine learning clustering algorithm used by vulnerability triage tool 102 to cluster source code fingerprints of the set of source code fingerprints 120a through 120n into fingerprint clusters 124a through 124p. Such clustering is performed based on similarities between fingerprints 120a through 120n, as determined by the machine learning clustering algorithm. In particular, in certain embodiments, each fingerprint cluster 124a through 124p may include multiple fingerprints 120 that share one or more common features, and/or include one or more similar features, as determined by machine learning clustering algorithm 136a. In some embodiments, the set of fingerprint clusters 124 may include a cluster 124p that stores one or more source code fingerprints 120 that are not similar to any of the other source code fingerprints. For example, the set of fingerprint clusters 124 may include a cluster 124p that stores a first fingerprint 120n that machine learning clustering algorithm 136a determined was not similar to any of the other source code fingerprints 120a through 120m, and a second fingerprint 120m that machine learning clustering algorithm 136a determined was not similar to any of the other source code fingerprints 120a through 120l, and 120n.

Machine learning clustering algorithm 136a may be any suitable machine learning clustering algorithm, including, for example, an unsupervised machine learning algorithm. For example, in certain embodiments, machine learning clustering algorithm 136a may be a K-means clustering algorithm. In some embodiments, machine learning clustering algorithm 136a may implement fuzzy logic. The use of fuzzy logic may enable tuning of the size and/or number of clusters 124 generated by machine learning clustering algorithm 136a.

In response to applying machine learning clustering algorithm 136a, to generate clusters 124, vulnerability triage tool 102 is configured to store clusters 124 in database 118. As illustrated in FIG. 1, database 118 is any storage location within system 100 where the source code fingerprints 120 and/or fingerprint clusters 124 may be stored. For example, database 118 may correspond to a database, a server, a local storage system, an external storage system, cloud storage, and/or any other suitable storage location.

Each fingerprint cluster 124 stored in database 118 is associated with (1) one or more source code segments 112, from which the fingerprints 120 included in the cluster were generated, and (2) one or more sets of vulnerability findings 116, which were generated by SAST tool 113 for the one or more source code segments 112 from which the fingerprints 120 included in the cluster were generated. For example, a given fingerprint cluster 124a that includes a first fingerprint 120a and a second fingerprint 120b is associated with (1) a first source code segment 112a, from which first fingerprint 120a was generated, (2) a second source code segment 112b, from which second fingerprint 120b was generated, (3) a first set of vulnerability findings 116a, which were generated by SAST tool 113 for the first source code segment 112a, and (4) a second set of vulnerability findings 116b, which were generated by SAST tool 113 for the second source code segment 112b. In certain embodiments, one or more of vulnerability findings included in the sets of vulnerability findings 116 associated with a given fingerprint cluster 124 have been verified by an external review process. For example, user 104 may have investigated one or more of the vulnerability findings and classified them as actual vulnerabilities and/or false positives.

Memory 128 may also store a second machine learning algorithm—machine learning algorithm 136b—that is designed to leverage the information associated with each cluster 124 to identify likely real vulnerabilities, likely false positives, and/or likely false negatives for the source code segments 112 associated with the cluster, based on the assumption that similar source code segments (as determined based on the similarity of their source code fingerprints) are likely to be affected by similar security vulnerabilities. As an example, a first source code segment that has been written in a first programming language (e.g., C++) to perform a given function is a particular manner is likely to be affected by the same security vulnerability as a second source code segment that has been written in a second programming language (e.g., Java) to perform the same function in the same manner as the first source code segment. Accordingly, if a vulnerability finding 116 for the first source code segment has been classified as an actual vulnerability during an external review process, there is a high probability that a similar vulnerability finding for the second source code segment is also an actual vulnerability. As another example, if a particular vulnerability finding has been identified for the majority of the source code segments 112 that are included within a given fingerprint cluster 124, there is a reasonable probability that that particular vulnerability finding should also have been identified for the remaining source code segments 112 included within the fingerprint cluster (e.g., the particular vulnerability finding is a false negative for those remaining source code segments). Machine learning algorithm 136b is any suitable machine learning algorithm that is configured to identify likely actual vulnerabilities, likely false positives, and/or likely false negatives within the vulnerability findings 116 generated for the source code segments 112 associated with a given fingerprint cluster 124. For example, machine learning algorithm 136b may be a neural network machine learning algorithm or any other suitable machine learning algorithm. In certain embodiments, machine learning algorithm 136b may implement gradient descent iterative methods. In some embodiments, machine learning algorithm 136b may implement a "drunkards walk" technique.

Modifications, additions, or omissions may be made to the systems described herein without departing from the scope of the invention. For example, system 100 may include any number of existing users 104, devices 106, networks 108, databases 110, database 114, databases 118, source code segments 112, SAST tools 113, source code vulnerability findings 116, source code fingerprints 120, fingerprint clusters 124, processors 126, memories 128, semantic analysis algorithms 132, data flow analysis algorithms 134, and/or machine learning algorithms 136a/b. The components may be integrated or separated. Moreover, the operations may be performed by more, fewer, or other components. Additionally, the operations may be performed using any suitable logic comprising software, hardware, and/or other logic.

II. Process for Automatically Identifying False Positives and Real Vulnerabilities Using Source Code Fingerprints FIG. 2 illustrates an example process by which vulnerability triage tool 102 analyzes the vulnerability findings 116 generated by SAST tool 113, and leverages previously validated vulnerability findings (e.g., vulnerability findings 116 that have been classified as false positives and/or actual vulnerabilities during external review) to identify likely false positives, likely actual vulnerabilities, and/or likely false negatives within the vulnerability findings 116 that have not undergone external review.

As illustrated in FIG. 2 (described in conjunction with elements of FIG. 1), vulnerability triage tool 102 first performs semantic analysis 202 and data flow analysis 204 on source code segments 112. During semantic analysis 202, vulnerability triage tool 102 applies one or more semantic analysis algorithms 132 to source code segments 112a through 112n, to generate an abstract syntax tree for each source code segment. During data flow analysis 204, vulnerability triage tool 102 applies one or more data flow analysis algorithms 134 to source code segments 112a through 112n, to generate information about the ingress, egress, and usage of data within each source code segment.

Next, vulnerability triage tool 102 performs fingerprint creation process 206. During fingerprint creation process 206, vulnerability triage tool 102 augments each abstract syntax tree generated during semantic analysis 202 with the data flow information generated during data flow analysis 204. Vulnerability triage tool 102 then flattens each resulting augmented abstract syntax tree to generate a set of fingerprints 120. Each fingerprint 120a through 120n corresponds to a given source code segment 112a through 112n, and provides information about the structure and function of the source code segment.

During process 208, vulnerability triage tool 102 groups similar fingerprints 112 together to generate clusters 124 of similar source code fingerprints 112. As an example, in certain embodiments, vulnerability triage tool 102 may compare fingerprints of the set of fingerprints to identify two or more identical fingerprints, and group these identical fingerprints together, as a given cluster 124a. As another example, in some embodiments, vulnerability triage tool 102 may apply machine learning clustering algorithm 136a to fingerprints 112, to cluster fingerprints 112 according to the similarity of features within the fingerprints, as determined by the machine learning clustering algorithm. As explained above, in the discussion of FIG. 1, machine learning clustering algorithm 136a may be any suitable machine learning clustering algorithm. For example, in certain embodiments, machine learning clustering algorithm 136a may correspond to a k-means clustering algorithm. In some embodiments, machine learning clustering algorithm 136a may be a machine learning clustering algorithm that implements fuzzy logic.

In certain embodiments, clustering process 208 results in a set of clusters (e.g., clusters 124a through 124o) that each include similar source code fingerprints 112, and a cluster 124p that includes dissimilar source code fingerprints 112 (e.g., source code fingerprints 112 that machine learning algorithm 136a was unable to determine were similar to any of the other fingerprints 112.

After grouping source code fingerprints 112 into clusters 124, vulnerability triage tool 102 next performs vulnerability cluster analysis 212, by identifying the vulnerability findings 116 that have been generated through a security analysis 210 performed by SAST tool 113 on the source code segments 112 associated with each cluster 124. Those vulnerability findings 116 are then grouped with their corresponding source code segments 112 for further analysis by vulnerability triage tool 102. For example, consider a fingerprint cluster 124a that includes a first source code fingerprint 120a, generated from a first source code segment 112a, and a second source code fingerprint 120b, generated from a second source code segment 112b. During vulnerability cluster analysis 212, vulnerability triage tool 102 identifies the vulnerability findings 116a that were generated through security analysis 210 of the first source code segment 112a, and the vulnerability findings 116b that were generated through security analysis 210 of the second source code segment 112b, and groups these together with the associated source code segments for further analysis.

In certain embodiments, security analysis 210 includes the security analysis performed by SAST tool 113 on each source code segment 112, as well as any external review performed on the vulnerability findings generated by SAST tool 113. For example, in response to SAST tool 113 generating vulnerability findings 116a for source code segment 112a, user 104 may review/investigate vulnerability findings 116a and/or source code segment 112a to determine whether or not any of the vulnerability findings 116a are false positives. In particular, as a result of such review process, user 104 may classify one or more of vulnerability findings 116a as false positives, and/or one or more of vulnerability findings 116a as actual vulnerabilities. Such classification may be added to vulnerabilities findings 116a, as those findings are stored in database 114.

After performing vulnerability cluster analysis 212 to generate groups of vulnerability findings 116 that are associated with similar source code segments 112 (as determined based on the similarity of their corresponding source code fingerprints 120), vulnerability triage tool 102 next performs error analysis 214. During error analysis 214, vulnerability triage tool 102 may leverage vulnerability findings 116 that have undergone external review/validation to automatically classify certain vulnerability findings that have not undergone such external review/validation as likely false positives and/or likely actual vulnerabilities, and/or identify likely false negatives (e.g., likely vulnerabilities within a given source code segment 112 that were not identified as vulnerability findings by SAST tool 113).

As a first example, consider a cluster 124a that includes a pair of fingerprints—first fingerprint 120a, corresponding to first source code segment 112a, and second fingerprint 120b—that vulnerability triage tool 102 has determined are identical. Furthermore, consider that (1) the vulnerability findings 116a for the first source code segment 112a include a first vulnerability finding and a second vulnerability finding, and that these vulnerability findings 116a have undergone external review during which the first vulnerability finding was classified as an actual vulnerability, and the second vulnerability finding was classified as a false positive; and (2) the vulnerability findings 116b for the second source code segment 112b include the same first vulnerability findings and the same second vulnerability finding, but that these vulnerability findings 116b have not undergone external review. During error analysis 214, vulnerability triage tool 102 may be configured to compare vulnerability findings 116a and vulnerability findings 116b and to classify the first vulnerability finding of vulnerability findings 116b as an actual vulnerability, and the second vulnerability finding of vulnerability findings 116b as a false positive, under the assumption that source code segments 112a/b that result in identical source code fingerprints 120a/b will exhibit the same vulnerabilities as one another. By automatically classifying the second vulnerability finding of vulnerability findings 116b as a false positive, based on the same vulnerability finding in similar source code being classified as a false positive, vulnerability triage tool 102 may enable system 100 to conserve the computational resources that would otherwise be expended by user 104 manually reviewing this vulnerability finding. Furthermore, in certain embodiments, vulnerability triage tool 102 may be configured to automatically resolve the actual vulnerability within source code segments 112b (corresponding to the first vulnerability finding of vulnerability findings 116b), based on any knowledge the tool may have of the manner by which the actual vulnerability was resolved within source code segment 112a. For example, in certain embodiments, vulnerability triage tool 102 may store, within memory 128, repair instructions associated with the vulnerability, which include instructions for modifying the source code associated with the vulnerability, in order to resolve the vulnerability. Vulnerability triage tool 102 may then execute these instructions, to modify source code segment 112b, thereby resolving the vulnerability.

As another example, consider a cluster 124b that includes a pair of fingerprints—fingerprint 120c, corresponding to source code segment 112c, and fingerprint 120d, corresponding to source code segment 112d—that vulnerability triage tool 102 has also determined are identical to one another. Furthermore, consider that (1) the vulnerability findings 116c for source code segment 112c include a first vulnerability finding and a second vulnerability finding; and (2) the vulnerability findings 116d for source code segment 112d do not include any vulnerability findings. During error analysis 214, vulnerability triage tool 102 may be configured to compare vulnerability findings 116c and vulnerability findings 116d, and determine that these vulnerability findings are inconsistent with one another. In particular, given that the source code fingerprints generated from source code segment 112c and source code segment 112d are identify, vulnerability triage tool 102 expects that both source code segments should exhibit the same vulnerabilities as one another. Accordingly, vulnerability triage tool 102 may transmit an alert to device 106 and/or SAST tool 113 indicating that an error may have occurred during the SAST analysis, leading to the inconsistent vulnerability findings.

As a further example, consider a cluster 124c that includes several fingerprints—fingerprint 120e, corresponding to source code segment 112e, fingerprint 120f, corresponding to source code segment 112f, and fingerprint 120g, corresponding to source code segment 112g—that were grouped together into cluster 124c by machine learning clustering algorithm, 136a, based on similarities among the fingerprints. Each of source code segments 112e through 112g are associated with a set of vulnerability findings 116e through 116g. In certain embodiments, one or more of the vulnerabilities findings included in vulnerability findings 116e through 116g have been validated during an external review process (e.g., classified as actual vulnerabilities and/or false positives). Vulnerability triage tool 102 may be configured to apply machine learning algorithm 136b to vulnerability findings 116e through 116g to determine a probability that each vulnerability finding corresponds to a false positive. For example, machine learning algorithm 136b may be configured to determine that a vulnerability finding of the set of vulnerability findings 116e is likely a false positive, where the set of vulnerability findings 116g includes the same vulnerability finding, and it was classified as a false positive during an external review. Similarly, machine learning algorithm 136b may be configured to identify a false negative for the set of vulnerability findings 116e, where each of the other sets of vulnerability findings 116f and 116g include a given vulnerability finding, while the set of vulnerability findings 116e does not.

While the above example is a relatively simple example of the application of machine learning algorithm 136b, this disclosure contemplates that machine learning algorithm 136b may be applied to much more complex situations. For example, machine learning algorithm 136b may be applied to the vulnerability findings associated with a collection of hundreds of source code segments 112 that vulnerability triage tool 102 has grouped together as similar. For a given source code segment 112i, machine learning algorithm 136b may be configured to assign a false positive probability to each vulnerability finding of the associated set of vulnerability findings 116i, based on the frequency of similar vulnerability findings within the collection (e.g., identification of the same type of vulnerability within other source code segments 112 within the collection of source code segments under consideration), the results of any external review performed on the similar vulnerability findings within the collection, and/or any other suitable factors. For example, machine learning algorithm 136b may determine that an 80% probability exists that a given vulnerability finding of the set of vulnerability findings 116i is a false positive, where similar vulnerability findings were made for 50% of the other source code segments within the collection, 20% of those similar vulnerability findings have undergone external review, and 90% of those similar vulnerability findings that have undergone external review have been classified as false positives.

By assigning false positive probabilities to the vulnerability findings 116 generated through SAST analysis, certain embodiments of vulnerability triage tool 102 are able to significantly reduce the computational resources consumed during the external review process and improve the security of system 100. For example, user 104 may prioritize those vulnerability findings that are likely to correspond to actual vulnerabilities, thereby resolving actual source code vulnerabilities within system 100 sooner than otherwise.

FIG. 3 presents a flowchart illustrating an example method 300 (described in conjunction with elements of FIGS. 1 and 2) used by vulnerability triage tool 102 to identify likely false positives within the vulnerability findings generated by a SAST tool.

During process 302, vulnerability triage tool 102 generates an abstract syntax tree for each source code element 112a through 112n, by applying semantic analysis algorithm 132. During process 304, vulnerability triage tool 102 augments each abstract syntax tree generated during process 302 with information obtained through an analysis of the data flow within the corresponding source code element 112. To perform such data flow analysis, vulnerability triage tool 102 applies data flow analysis algorithm 134 to each source code element 112. During process 306, vulnerability triage tool 102 flattens each augmented abstract syntax tree to generate a source code fingerprint 120 for each source code element 112. During process 308, vulnerability triage tool 102 groups the set of source code fingerprints 120 into clusters 124. As an example, in certain embodiments, vulnerability triage tool 102 groups source code fingerprints 120 into clusters 124 by identifying identical fingerprints within the set of source code fingerprints 120 and grouping such identical fingerprints into clusters 124. As another example, in certain embodiments, vulnerability triage tool 102 applies machine learning clustering algorithm 136a to fingerprints 120 to group the fingerprints into clusters 124.

During process 310, vulnerability triage tool 102 selects a first cluster 124a for consideration. During process 312, vulnerability triage tool 102 determines whether the cluster 124 is a cluster of identical fingerprints 120. If, during process 312 vulnerability triage tool 102 determines that the cluster includes two or more identical fingerprints 120, during process 314 vulnerability triage tool 102 determines whether the vulnerability findings 116 associated with each of the identical fingerprints are consistent with one another. If, during process 314 vulnerability triage tool 102 determines that the vulnerability findings 116 associated with each of the identical fingerprints are not consistent with one another, in step 316 vulnerability triage tool transmits an alert to user 104, notifying the user of this inconsistency. Method 300 then proceeds to process 320.

If, during process 314 vulnerability triage tool 102 determines that the vulnerability findings 116 associated with each of the identical fingerprints are consistent with one another, during process 318, vulnerability triage tool 102 propagates any verified vulnerability findings through the sets of vulnerability findings associated with the identical fingerprints. In particular, if a given vulnerability finding associated with one of the identical fingerprints was classified during external review as a false positive or an actual vulnerability, vulnerability triage tool 102 assigns this same classification to the corresponding vulnerability findings associated with the other identical fingerprints, under the assumption that the source code segments associated with the identical fingerprints should exhibit identical vulnerabilities.

During step 320, vulnerability triage tool 102 determines whether the set of fingerprint clusters 124 includes any additional clusters. If, during step 320 vulnerability triage tool 102 determines that the set of clusters 124 includes one or more additional clusters, during process 322 vulnerability triage tool 102 selects the next cluster for consideration. Method 300 then returns to process 312.

If, during process 312 vulnerability triage tool 102 determines that the cluster is not a cluster of identical fingerprints 120, during process 324 vulnerability triage tool 102 applies machine learning algorithm 136b to the vulnerability findings 116 associated with the cluster to classify one or more of the vulnerability findings as a likely false positive, and/or a likely actual vulnerability, and/or to identify one or more likely false negatives. During process 326 vulnerability triage tool 102 prioritizes for further review and/or remediation, the vulnerability findings that have been classified as likely corresponding to actual vulnerabilities. Method 300 then returns to process 320.

Modifications, additions, or omissions may be made to method 300 depicted in FIG. 3. Method 300 may include more, fewer, or other steps. For example, steps may be performed in parallel or in any suitable order. While discussed as vulnerability triage tool 102 (or components thereof) performing certain steps, any suitable components of system 100, including, for example, devices 106, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a database configured to store a plurality of source code segments comprising a first source code segment and a second source code segment;
   a memory configured to store:
      a first plurality of vulnerability findings for the first source code segment, wherein:
         a first vulnerability finding of the first plurality of vulnerability findings has been classified as a real vulnerability by an external review; and
         a second vulnerability finding of the first plurality of vulnerability findings has been classified as a false positive by the external review; and
      a second plurality of vulnerability findings for the second source code segment; and
   a hardware processor communicatively coupled to the memory and to the database, the hardware processor configured to:
      generate a plurality of source code fingerprints, each source code fingerprint of the plurality of source code fingerprints corresponding to a source code segment of the plurality of source code segments, wherein generating the source code fingerprint comprises:
         generating, from the corresponding source code segment, an abstract syntax tree;
         performing a data flow analysis on the corresponding source code segment, to generate information identifying flows of data through the corresponding source code segment;
         augmenting the abstract syntax tree associated with the source code segment with the information identifying the flows of data through the source code segment; and
         flattening the augmented abstract syntax tree associated with the source code segment;
      determine that the source code fingerprint corresponding to the first source code segment matches the source code fingerprint corresponding to the second source code segment; and
      in response to determining that the source code fingerprint corresponding to the first source code segment matches the source code fingerprint corresponding to the second source code segment:
   automatically classify a first vulnerability finding of the second plurality of vulnerability findings as the real vulnerability, in response to determining that the first vulnerability finding of the second plurality of vulnerability findings matches the first vulnerability finding of the first plurality of vulnerability findings; and
   automatically classify a second vulnerability finding of the second plurality of vulnerability findings as the false positive, in response to determining that the second vulnerability finding of the second plurality of vulnerability findings matches the second vulnerability finding of the first plurality of vulnerability findings.

2. The system of claim 1, wherein:
the memory is further configured to store repair instructions associated with the verified vulnerability finding; and
the hardware processor is further configured to, in response to automatically classifying the first vulnerability finding of the second plurality of vulnerability findings as the real vulnerability, modify the second source code segment, based on the repair instructions, to resolve the real vulnerability.

3. The system of claim 1, wherein:
the plurality of source code segments further comprises a third source code segment;
the memory is further configured to store a third plurality of vulnerability findings for the third source code segment; and
the hardware processor is further configured to:
   determine that the source code fingerprint corresponding to the third source code segment matches the source code fingerprint corresponding to the first source code segment; and
   in response to determining that the source code fingerprint corresponding to the third source code segment matches the source code fingerprint corresponding to the first source code segment:
      determine that the third plurality of vulnerability findings does not match the first plurality of vulnerability findings; and
      in response to determining that the third plurality of vulnerability findings does not match the first plurality of vulnerability findings, transmit an alert to a device of an administrator.

4. The system of claim 1, wherein:
the plurality of source code segments further comprises a third source code segment;
the memory is further configured to store a third plurality of vulnerability findings for the third source code segment; and
the hardware processor is further configured to:
   determine that the source code fingerprint corresponding to the third source code segment does not match any other source code fingerprints of the plurality of source code fingerprints; and
   in response to determining that the source code fingerprint corresponding to the third source code segment does not match any of the other source code fingerprints of the plurality of source code fingerprints, transmit the third plurality of vulnerability findings to an external system for external review.

5. The system of claim 1, wherein the first plurality of vulnerability findings for the first source code segment comprises at least one of:
a buffer overflow vulnerability;
an SQL injection vulnerability; and
a cross-site scripting vulnerability.

6. The system of claim 1, wherein:
the plurality of source code segments further comprises a third source code segment;
the memory is further configured to store a third plurality of vulnerability findings for the third source code segment; and
the hardware processor is further configured to:
   determine that the source code fingerprint corresponding to the third source code segment matches the source code fingerprint corresponding to the first source code segment; and
   in response to determining that the source code fingerprint corresponding to the third source code segment matches the source code fingerprint corresponding to the first source code segment:
      automatically classify a first vulnerability finding of the third plurality of vulnerability findings as the real vulnerability, in response to determining that the first vulnerability finding of the third plurality of vulnerability findings matches the first vulnerability finding of the first plurality of vulnerability findings; and
      automatically classify a second vulnerability finding of the third plurality of vulnerability findings as the false positive, in response to determining that the second vulnerability finding of the third plurality of vulnerability findings matches the second vulnerability finding of the first plurality of vulnerability findings.

7. The system of claim 1, wherein:
the first source code segment is associated with a first application; and
the second source code segment is associated with a second application different from the first application.

8. A method comprising:
generating a plurality of source code fingerprints, each source code fingerprint of the plurality of source code fingerprints corresponding to a source code segment of a plurality of source code segments, wherein generating the source code fingerprint comprises:
   generating, from the corresponding source code segment, an abstract syntax tree;
   performing a data flow analysis on the corresponding source code segment, to generate information identifying flows of data through the corresponding source code segment;
   augmenting the abstract syntax tree associated with the source code segment with the information identifying the flows of data through the source code segment; and
   flattening the augmented abstract syntax tree associated with the source code segment;
determining that the source code fingerprint corresponding to a first source code segment matches the source code fingerprint corresponding to a second source code segment, wherein:
   the first plurality of vulnerability findings comprise:
      a first vulnerability finding that has been classified as a real vulnerability by an external review; and
      a second vulnerability finding that has been classified as a false positive by the external review; and in response to determining that the source code fingerprint corresponding to the first source code segment matches the source code fingerprint corresponding to the second source code segment:
  automatically classifying a first vulnerability finding of the second plurality of vulnerability findings as the verified vulnerability finding, in response to determining that the first vulnerability finding of the second plurality of vulnerability findings matches the first vulnerability finding of the first plurality of vulnerability findings; and
  automatically classifying a second vulnerability finding of the second plurality of vulnerability findings as the false positive, in response to determining that the second vulnerability finding of the second plurality of vulnerability findings matches the second vulnerability finding of the first plurality of vulnerability findings.

9. The method of claim 8, further comprising, in response to automatically classifying the first vulnerability finding of the second plurality of vulnerability findings as the real vulnerability, modifying the second source code segment, based on repair instructions associated with the real vulnerability, to resolve the real vulnerability.

10. The method of claim 8, wherein:
the plurality of source code segments further comprises a third source code segment; and
the method further comprises:
  determining that the source code fingerprint corresponding to a third source code segment matches the source code fingerprint corresponding to the first source code segment; and
  in response to determining that the source code fingerprint corresponding to the third source code segment matches the source code fingerprint corresponding to the first source code segment:
    determining that the third plurality of vulnerability findings does not match the first plurality of vulnerability findings; and
    in response to determining that the third plurality of vulnerability findings does not match the first plurality of vulnerability findings, transmitting an alert to a device of an administrator.

11. The method of claim 8, wherein:
the plurality of source code segments further comprises a third source code segment;
determining that the source code fingerprint corresponding to the third source code segment does not match any of the other source code fingerprints of the plurality of source code fingerprints; and
in response to determining that the source code fingerprint corresponding to the third source code segment does not match any of the other source code fingerprints of the plurality of source code fingerprints, transmitting the third plurality of vulnerability findings to an external system for external review.

12. The method of claim 8, wherein the first plurality of vulnerability findings for the first source code segment comprises at least one of:
a buffer overflow vulnerability;
an SQL injection vulnerability; and
a cross-site scripting vulnerability.

13. The method of claim 8, wherein:
the plurality of source code segments further comprises a third source code segment; and
the method further comprises:
  determining that the source code fingerprint corresponding to the third source code segment matches the source code fingerprint corresponding to the first source code segment; and
  in response to determining that the source code fingerprint corresponding to the third source code segment matches the source code fingerprint corresponding to the first source code segment:
    automatically classifying a first vulnerability finding of the third plurality of vulnerability findings as the real vulnerability, in response to determining that the first vulnerability finding of the third plurality of vulnerability findings matches the first vulnerability finding of the first plurality of vulnerability findings; and
    automatically classifying a second vulnerability finding of the third plurality of vulnerability findings as the false positive, in response to determining that the second vulnerability finding of the third plurality of vulnerability findings matches the second vulnerability finding of the first plurality of vulnerability findings.

14. The method of claim 8, wherein:
the first source code segment is associated with a first application; and
the second source code segment is associated with a second application different from the first application.

15. A non-transitory computer-readable medium storing instructions that, when executed by a hardware processor, cause the processor to:
generate a plurality of source code fingerprints, each source code fingerprint of the plurality of source code fingerprints corresponding to a source code segment of a plurality of source code segments, wherein generating the source code fingerprint comprises:
  generating, from the corresponding source code segment, an abstract syntax tree;
  performing a data flow analysis on the corresponding source code segment, to generate information identifying flows of data through the corresponding source code segment;
  augmenting the abstract syntax tree associated with the source code segment with the information identifying the flows of data through the source code segment; and
  flattening the augmented abstract syntax tree associated with the source code segment;
determine that the source code fingerprint corresponding to a first source code segment matches the source code fingerprint corresponding to a second source code segment, wherein:
  the first plurality of vulnerability findings comprise:
    a first vulnerability finding that has been classified as a real vulnerability by an external review; and
    a second vulnerability finding that has been classified as a false positive by the external review; and
in response to determining that the source code fingerprint corresponding to the first source code segment matches the source code fingerprint corresponding to the second source code segment:
  automatically classify a first vulnerability finding of the second plurality of vulnerability findings as the real vulnerability, in response to determining that the first vulnerability finding of the second plurality of vulnerability findings matches the first vulnerability finding of the first plurality of vulnerability findings; and automatically classify a second vulnerability finding of the second plurality of vulnerability findings as the false positive, in response to determining that the second vulnerability finding of the second plurality of vulnerability findings matches the second vulnerability finding of the first plurality of vulnerability findings.

16. The non-transitory computer-readable medium of claim 15, wherein the instructions, when executed by the hardware processor, further cause the processor to, in response to automatically classifying the first vulnerability finding of the second plurality of vulnerability findings as the real vulnerability, modify the second source code segment, based on repair instructions associated with the real vulnerability, to resolve the real vulnerability.

17. The non-transitory computer-readable medium of claim 15, wherein the instructions, when executed by the hardware processor, further cause the processor to:
   determine that the source code fingerprint corresponding to a third source code segment matches the source code fingerprint corresponding to the first source code segment; and
   in response to determining that the source code fingerprint corresponding to the third source code segment matches the source code fingerprint corresponding to the first source code segment:
      determine that the third plurality of vulnerability findings does not match the first plurality of vulnerability findings; and
      in response to determining that the third plurality of vulnerability findings does not match the first plurality of vulnerability findings, transmit an alert to a device of an administrator.

18. The non-transitory computer-readable medium of claim 15, wherein the instructions, when executed by the hardware processor, further cause the processor to:
   determine that the source code fingerprint corresponding to a third source code segment does not match any other source code fingerprints of the plurality of source code fingerprints; and
   in response to determining that the source code fingerprint corresponding to the third source code segment does not match any of the other source code fingerprints of the plurality of source code fingerprints, transmit the third plurality of vulnerability findings to an external system for external review.

19. The non-transitory computer-readable medium of claim 15, wherein the first plurality of vulnerability findings for the first source code segment comprises at least one of:
   a buffer overflow vulnerability;
   an SQL injection vulnerability; and
   a cross-site scripting vulnerability.

20. The non-transitory computer-readable medium of claim 15, wherein the instructions, when executed by the hardware processor, further cause the processor to:
   determine that the source code fingerprint corresponding to a third source code segment matches the source code fingerprint corresponding to the first source code segment; and
   in response to determining that the source code fingerprint corresponding to the third source code segment matches the source code fingerprint corresponding to the first source code segment:
      automatically classify a first vulnerability finding of the third plurality of vulnerability findings as the real vulnerability, in response to determining that the first vulnerability finding of the third plurality of vulnerability findings matches the first vulnerability finding of the first plurality of vulnerability findings; and
      automatically classify a second vulnerability finding of the third plurality of vulnerability findings as the false positive, in response to determining that the second vulnerability finding of the third plurality of vulnerability findings matches the second vulnerability finding of the first plurality of vulnerability findings.

* * * * *